United States Patent [19]

Patel et al.

[11] Patent Number: 4,808,665

[45] Date of Patent: Feb. 28, 1989

[54] CROSSLINKED BLENDS

[75] Inventors: Raman Patel, Akron; Yun L. Wang, Wadsworth; Sabet Abdou-Sabet, Akron, all of Ohio

[73] Assignee: Monsanto Company, St. Louis, Mo.

[21] Appl. No.: 107,210

[22] Filed: Oct. 13, 1987

[51] Int. Cl.[4] .................. C08L 23/26; C08L 23/16; C08L 23/04; C08L 9/00

[52] U.S. Cl. .................................. 525/133; 525/194; 525/211; 525/240; 525/232; 522/112

[58] Field of Search ............... 525/240, 133, 211, 194, 525/232; 522/112

[56] References Cited

U.S. PATENT DOCUMENTS

| | | | |
|---|---|---|---|
| 3,256,366 | 6/1966 | Corbelli | 525/194 |
| 3,701,702 | 10/1972 | Shichman et al. | 525/232 |
| 3,758,643 | 9/1973 | Fischer | 525/240 |
| 3,989,611 | 11/1976 | Shurpik | 204/159.18 |
| 4,102,761 | 7/1978 | Böhm et al. | 525/232 |
| 4,104,210 | 8/1978 | Coran et al. | 525/232 |
| 4,130,535 | 12/1978 | Coran et al. | 525/211 |
| 4,202,801 | 5/1980 | Petersen | 525/232 |
| 4,264,490 | 4/1981 | Berejka | 260/45.85 |
| 4,271,049 | 6/1981 | Coran et al. | 525/232 |
| 4,300,988 | 11/1981 | Berejka et al. | 204/159.2 |
| 4,311,628 | 1/1982 | Sabet et al. | 525/232 |
| 4,348,266 | 9/1982 | Coran et al. | 204/159.17 |
| 4,480,074 | 10/1984 | Wang | 525/194 |
| 4,687,810 | 8/1987 | Coran | 525/232 |

OTHER PUBLICATIONS

Kirk-Othmer Enc. of Chem. Tech. '82, vol. 19, pp. 607-614, 353-355.

Becker "EB Processing"—Plastics World, Feb. 1977, pp. 48-50.

Spenadel "Electron Beam Curing" Exxon Chemical Co., Jan. 1978.

Primary Examiner—Carman J. Seccuro
Attorney, Agent, or Firm—Gordon B. Seward

[57] ABSTRACT

Shaped articles are made from blends of rubber and plastic in which the rubber is in the form of discrete vulcanized particles dispersed in the plastic. After shaping the articles, they are exposed to free-radical crosslinking which converts the blends from thermoplastics to thermosets.

10 Claims, No Drawings

CROSSLINKED BLENDS

BACKGROUND OF THE INVENTION

This invention relates to shaped articles formed from blends of rubber and plastic, and to a method for making them.

It is known to make shaped articles from thermoplastic materials by molding or extruding them from the thermoplastic materials in a fluid state, then cooling them to the solid state. Articles so made have the disadvantage that their service temperatures are limited by the melting (or softening) point of the materials. If exposed to service temperatures in excess of the melting (or softening) point, the articles lose their dimensional integrity.

Thermoplastic elastomers have been developed which have the rubbery characteristics of elastomers, but can be shaped as thermoplastics. Here again, the service temperatures of articles formed from these materials are limited by the melting (or softening) points of the elastomers.

If rubbery qualities are desired in an article, conventional thermoset rubber can be used, however, both heat and pressure are required to produce thermoset articles, and even the fastest vulcanizing rubber compounds require much more molding time than typical thermoplastics. Scrap from thermoset rubber production cannot be reworked.

SUMMARY OF THE INVENTION

It has now been found that shaped articles can be formed from thermoplastic blends of rubber and plastic which exhibit service temperatures above the melting point of the plastic alone, and significantly higher than previously attained.

The articles of the invention are shaped from a blend of rubber and plastic, and then the articles are exposed to free-radical crosslinking so as to convert the blend from a thermoplastic to a thermoset. The blends which are used are intimate mixtures of rubber and crystalline plastic polymer from ethylene monomer. The rubber in the blends is in the form of discrete, vulcanized particles dispersed in the plastic. This dispersion can be formed by a process in which the rubber is dynamically vulcanized in combination with the plastic, by thoroughly blending a mixture of rubber and plastic at a temperature above the melting point of the plastic then adding rubber curatives and masticating at vulcanizing temperature until the rubber is vulcanized. Preferred blends are those in which the rubber particles are of a number average diameter of 50 $\mu$m or less, more preferably 5 $\mu$m or less.

The proportions of rubber and plastic in the blend can vary from 15 to 85, usually 25 to 75, parts of rubber, and correspondingly, 85 to 15, usually 75 to 25, parts plastic, by weight, based on 100 parts of total rubber and plastic. Optionally, other materials can be present in the blend besides the rubber, plastic and rubber curatives. These other materials include oils, plasticizers or other softeners; colorants; fillers such as carbon black, silica, clay, talc, calcium carbonate, alumina or feldspar; antidegradants; flame or smoke retardants, and other well-known additives for rubber and plastics.

The rubber can be a rubbery homopolymer or copolymer from conjugated diene monomer, such as polyisoprene, polybutadiene or butadiene/styrene copolymer or a copolymer from ethylene and propylene, referred to as EPR. Or, more preferably, the rubber is a terpolymer of ethylene, propylene and a nonconjugated diene monomer, commonly known as EPDM rubber. Preferred non-conjugated diene monomers include acyclic dienes such as 1,4-hexadiene, cyclic dienes such as 1,5-cyclo-octadiene, dicyclic dienes such as dicyclopentadiene and bridged ring bicyclic dienes such as 5-ethylidenenorbornene, the last named diene being especially preferred. The preferred EPDM rubbers will contain a major portion of ethylene monomer units, a lesser amount of propylene monomer units and a minor amount of diene monomer units.

The plastic portion of the blend is a polymer from ethylene, preferably crystalline polyethylene, although a small amount of amorphous polyethylene can be present. The ethylene polymer can also contain monomeric units from other alpha olefins, such as propylene, 1-butylene and the like. Copolymers from ethylene and a minor amount of an acrylic, methacrylic, olefinic or vinyl ester monomer can also be used.

The rubber portion of the blend is vulcanized (or "cured") before the article is shaped. For purposes of clarity, this vulcanization step will be referred to either as vulcanization or curing; the post-shaping reaction will be referred to as crosslinking. Vulcanization can be accomplished by means of any one of several mechanisms, as is well known in the art, such as by sulfur vulcanization systems, phenolic curatives, peroxide curatives or other crosslinking mechanisms. Sulfur systems employ. sulfur itself, usually with an accelerator, which can be an organic sulfur compound. So-called "sulfur donors," such as dimorpholine disulfide can be used as a replacement for some or all of the sulfur. Phenolic cure systems are also well known, and are described in detail in U. S. Pat. No. 4,311,628 and in "Vulcanization and Vulcanizing Agents" by W. Hoffman, Palmerton Press. Preferred phenolic cure systems are based on phenolic resins such as, for example, dimethylol phenolic resins, either halogenated or non-halogenated. The conjoint use of one or more activators with the phenolic resins, is recommended. The term "activator" as used herein means any substance which materially increases the crosslinking efficiency of the phenolic resin, and includes metal oxides and halogen donors used alone or conjointly. Among metal oxides, zinc oxide is especially recommended. If a non-halogenated phenolic resin is used, a Lewis acid, which can be a halogen donor, such as a metal halide, stannous chloride, for example, or a halogenated polymer, such as chlorosulfonated polyethylene may be used; and if a complete cure of the rubber is desired, a Lewis acid or halogen donor is highly recommended for use with a non-halogenated phenolic resin. Typically, from 1 to 20 parts of phenolic resin and from 0.5 to 50 parts of activators are used per 100 parts of rubber.

As set forth in U. S. Pat. No. 4,130,535, the EPR or EPDM can be vulcanized using other cure systems, including sulfur-accelerator systems, azide systems, organic peroxide systems or high-energy radiation.

The preferred dynamic vulcanization method can utilize any of the above curing systems, although high-energy radiation is less conveniently employed. Typically, the blend of one or more rubbers and plastics, along with the rubber curative, is masticated in a high-shear internal mixer under heat and pressure. Batch systems employing internal mixers such as the Banbury mixer may be used, or the blend may be dynamically vulcanized in a continuous system, using a twin-screw mixing extruder, as described in U. S. Pat. No. 4,594,390.

The degree of vulcanization of the rubber is important, as it will affect the physical properties of the blend. Generally, it is preferred to effect complete vulcanization of the rubber in the blend, as measured in a variety of ways. However, a partial-cure can be effected, usually by incorporating insufficient curative to completely crosslink the rubber. Partial cure may also be obtained by using a non-halogenated phenolic resin without a Lewis acid. Extraction tests using certain solvents can provide a measure of the degree of cure of the rubber. For example, a blend in which the rubber is vulcanized to the extent that no more than three percent of the vulcanizable rubber is extractable from a thin film of the blend in cyclohexane at 23° C. is considered fully cured. In another known test method, the blend is extracted with boiling xylene. Here, if no more than five percent of the vulcanizable rubber is extractable, the rubber can be considered fully cured. If an incomplete cure is desired, as much as twenty or twenty five percent or more of the vulcanizable rubber can be extractable in boiling xylene.

Fully cured rubber will give blends which have less oil-swell, lower compression set and tension set properties and other improved physical properties compared to those blends in which the rubber is incompletely cured.

Vulcanization can be accomplished by the action of certain organic peroxide compounds, as is known in the art. Dicumyl peroxide, for example, is used for this purpose. Other useful peroxides are listed below in the discussion of the crosslinking step. Similarly, the blend may be exposed to irradiation in order to vulcanize the rubber, although this technique is less effective in dynamic vulcanization because of the difficulty in irradiating the blend in an internal mixer.

After the blend is prepared, containing a rubber portion which is vulcanized to the desired degree and crosslinking agents and promoters, if used, the article is shaped by any convenient means. Various types of molding methods are suitable, depending on the nature, size and shape of the article, such as thermoforming, injection molding, compression molding, vacuum forming or blow molding. Articles may also be shaped by extrusion, such as profiles for gaskets and seals, or wire and cable can be made by continuously extruding a layer of the blend onto the wire or cable.

After the forming step the article is then subjected to the crosslinking operation, in which the thermoplastic blend is subjected to the action of a free-radical crosslinker so as to convert the blend into a thermoset. Such a thermoset will retain its dimensional integrity at service temperatures of 200° C. or above.

Preferred free-radical crosslinkers are radiation and organic peroxides. Alpha, beta and gamma radiation, produced by radioactive isotopes, is one category of useful radiation. X-rays, generated in X-ray processing equipment, are also effective. Finally, high-energy electron beam radiation can be used. Of these sources of radiation, high energy electron beam radiation is preferred, since it requires less shielding than is needed with gamma or X-rays, is more directional than radioactive isotopes, and has easy on-off switching capability.

Organic peroxides which are effective in the crosslinking reaction include both aromatic and aliphatic peroxides such as aromatic diacyl peroxides and aliphatic diacyl peroxides, dibasic acid peroxides, ketone peroxides, alkyl peroxyesters, alkyl hydroperoxides; for example, diacetylperoxide, dibenzoyl peroxide, bis-2,4-dichlorobenzoyl peroxide, 2,5-dimethyl-2,5-di(t-butylperoxy)hexane, di-tert-butyl peroxide, dicumyl peroxide, tert-butylperbenzoate, tert-butylcumyl peroxide, 2,5-bis(tert-butylperoxy)-2,5-dimethylhexane, lauryl peroxide, succinic acid peroxide, cyclohexanone peroxide, tert-butyl peracetate, butyl hydroperoxide and the like. Co-crosslinking agents such as trimethylol propane trimethacrylate, triallylphosphate and divinyl benzene can also be incorporated to advantage. The amount and type of peroxide used can be determined based on the half-life of the particular peroxide used, both at the temperature of incorporation and at the final crosslinking temperature. In other words, the peroxide should be sufficiently stable to withstand the mixing and shaping operations and sufficiently active to crosslink the blend after shaping. When using 2,5-dimethyl-2,5-di(t-butylperoxy) hexane, for example, 0.1 to 5.0, and preferably 0.5 to 2.0 parts by weight of the peroxide, based on the total weight of the blend, is effective to obtain the required degree of crosslinking.

The degree of crosslinking which is required is that which, broadly speaking, will convert the thermoplastic blend into a thermoset, so that on exposure to high temperatures the shaped articles will not revert to a plastic, flowable state, but will retain their dimensional integrity. Preferably, the articles which have been subjected to the crosslinking step of the invention will not flow below the temperature at which actual thermal degradation of the blend begins to occur. With the blends of the invention, this temperature is in the range of 250° C.–300° C., hence the article will have service temperatures of 200° C. or higher.

SPECIFIC EMBODIMENTS OF THE INVENTION

The articles of the invention and the methods by which they are made will be more clearly understood by reference to the following examples, in which all proportions are by weight unless otherwise expressly identified.

EXAMPLE I

To illustrate the cross-linked blends of the invention, thermoplastic vulcanizate blends of EPDM rubber and polyethylene were first prepared.

EPDM rubber (Epsyn ®-55, a terpolymer reported to contain 62% ethylene, 30.9% propylene and 7.1% ethylidenenorbornene) was first mixed with zinc oxide and stearic acid in a Haake laboratory internal mixer at 160° C. at 100 rpm. A linear, low-density polyethylene with a melt index of 2.3 and a density of 0.917 was then added, and the mixture thoroughly blended. A non-halogenated methylolphenolic resin (Schenectady SP-1045) was then added and mixing was continued until the vulcanization was completed, for several minutes after maximum torque readings were obtained. To some samples also were added trimethylolpropane triacrylate, a crosslinking promoter, and alumina trihydrate, a filler.

The blends were then removed from the mixer and compression-molded for 6 minutes at 210° C. to form sheets approximately 0.6 mm in thickness. These sheets were subjected to electron-beam radiation for varying dosages, and then measured for various physical properties, including stress/strain and tension set (according to ASTM D638 and ASTM D1566), hardness (Shore D or A) oil-swell (ASTM D-471; % increase in weight after 70 hours' immersion in ASTM #3 oil at 100° C.) and hot set (% elongation of a sample after one hour in a 200° C. hot-air oven).

The proportions, radiation dose levels and test results are set forth in Tables I, and II. Similar data are shown in Table III, wherein the polyethylene had a melt index of 2.8 and a density of 0.918.

The data in Tables I, II and III show that without radiation crosslinking, the samples failed the hot set test (infinite elongation). Even with 5 MRad dosage, (compositions 2 and 7) hot set values were poor. Compositions containing the crosslinking promoter showed better hot set properties at lower dosages than those without the promoter. As expected, as dosage levels increase, hot set values are improved.

The data in Tables II and III show that alumina trihydrate at high levels does not inhibit the crosslinking reaction. In all samples, the values for tension set and oil swell were improved by radiation, perhaps indicating that the rubber was additionally vulcanized by the radiation treatment.

EXAMPLE II

In order to demonstrate crosslinking by means of a peroxide, a series of trials was run in which compositions were first made from polyethylene and EPDM rubber, with the rubber dynamically vulcanized. Then, the compositions were combined with peroxide crosslinking agents and tested for physical properties.

Specifically, EPDM rubber, containing the same monomer ratio as used in Example I, but having a higher Mooney viscosity, and polyethylene (melt index—0.75, density 0.964) were combined in a Brabender mixer at 180° C. and 100 rpm. After two minutes of mixing, the polyethylene was molten and well mixed with the rubber.

TABLE I

| COMPOSITION | 1 | 2 | 3 | 4 | 5 | 6 | 7 | 8 | 9 | 10 |
|---|---|---|---|---|---|---|---|---|---|---|
| EPDM | 100 | → | → | → | → | → | → | → | → | → |
| Polyethylene | 300 | → | → | → | → | → | → | → | → | → |
| Phenolic Resin | 10 | → | → | → | → | → | → | → | → | → |
| Zinc Oxide | 5 | → | → | → | → | → | → | → | → | → |
| Stearic Acid | 1 | → | → | → | → | → | → | → | → | → |
| Cross-linking Promoter | — | — | — | — | — | 4.16 | → | → | → | → |
| Radiation Dosage, MRad | 0 | 5 | 10 | 20 | 40 | 0 | 5 | 10 | 20 | 40 |
| Properties | | | | | | | | | | |
| Ult. Tensile, MPa | — | 27.4 | 25.3 | 21.3 | 18.5 | 22.6 | 28.3 | 25.7 | 20.4 | 16.7 |
| $M_{100}$, MPA | — | 6.8 | 6.9 | 6.9 | 6.9 | 6.4 | 7.0 | 7.1 | 7.1 | 7.5 |
| Ult. Elong., % | — | 690 | 630 | 520 | 412 | 770 | 640 | 580 | 470 | 350 |
| Shore D | — | 36 | 37 | 38 | 38 | 38 | 36 | 37 | 39 | 39 |
| Ten. Set, % | — | 30 | — | 25 | 25 | 31 | 30 | 26 | 25 | 25 |
| Hot Set, % | — | INF. | 225 | 63 | 19 | INF. | 225 | 100 | 38 | 22 |
| Oil Swell, % | — | 194 | 189 | 172 | 122 | 206 | 171 | 154 | 129 | 126 |

TABLE II

| COMPOSITION: | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| EPDM | 100 | → | → | → | → | → | → | → | → | → | → | → | → | → | → |
| Polyethylene | 200 | → | → | → | → | → | → | → | → | → | → | → | → | → | → |
| Phenolic Resin | 10 | → | → | → | → | → | → | → | → | → | → | → | → | → | → |
| Zinc Oxide | 5 | → | → | → | → | → | → | → | → | → | → | → | → | → | → |
| Stearic Acid | 1 | → | → | → | → | → | → | → | → | → | → | → | → | → | → |
| Crosslinking Promoter | — | — | — | — | — | 3.16 | → | → | → | → | — | — | — | — | — |
| Alumina Trihydrate | — | — | — | — | — | — | — | — | — | — | 421 | → | → | → | → |
| Radiation Dosage, MRad | 0 | 5 | 10 | 20 | 40 | 0 | 5 | 10 | 20 | 40 | 0 | 5 | 10 | 20 | 40 |
| Properties | | | | | | | | | | | | | | | |
| Ult. Ten. MPa | — | 25.4 | 25.8 | 17.4 | 14.8 | 19.6 | — | 19.0 | 16.5 | 15.6 | — | 8.4 | 8.2 | 8.5 | 9.1 |
| $M_{100}$, MPa | — | 6.0 | 5.9 | 6.1 | 6.3 | 5.4 | 6.0 | 6.1 | 6.4 | 6.5 | — | 7.4 | 8.2 | — | — |
| Ult. Elong., % | — | 630 | 610 | 480 | 370 | 700 | 610 | 520 | 420 | 340 | — | 140 | 100 | 70 | 50 |
| Shore D | — | 37 | 37 | 38 | 40 | 33 | 37 | 37 | — | 37 | — | 50 | 50 | 50 | 54 |
| Ten. Set, % | — | 23 | 20 | 20 | 20 | — | 20 | 20 | 20 | 20 | — | — | — | — | — |
| Hot Set, % | — | INF. | 138 | 47 | 25 | INF. | INF. | 64 | 39 | 25 | — | 19 | 16 | 6 | 6 |
| Oil Swell, % | — | 213 | 213 | 176 | 136 | 220 | 202 | 195 | 157 | 141 | — | 62 | 58 | 47 | 40 |

TABLE III

| COMPOSITION: | 1 | 2 | 3 | 4 | 5 | 6 | 7 | 8 | 9 | 10 | 11 | 12 |
|---|---|---|---|---|---|---|---|---|---|---|---|---|
| EPDM | 100 | → | → | → | → | → | → | → | → | → | → | → |
| Polyethylene | 200 | → | → | → | → | → | → | → | → | → | → | → |
| Phenolic Resin | 10 | → | → | → | → | → | → | → | → | → | → | → |
| Zinc Oxide | 5 | → | → | → | → | → | → | → | → | → | → | → |
| Stearic Acid | 1 | → | → | → | → | → | → | → | → | → | → | → |
| Crosslinking Promoter | — | — | — | — | — | 3.16 | → | → | → | → | 7.9 | → |
| Alumina Trihydrate | — | — | — | — | — | — | — | — | — | — | 421 | → |
| Radiation Dosage, MRad | 0 | 5 | 10 | 20 | 40 | 0 | 5 | 10 | 20 | 40 | 5 | 20 |
| Properties | | | | | | | | | | | | |
| Ult. Ten., MPa | — | 13.7 | 12.8 | 11.9 | 9.5 | 12.3 | 13.8 | 14.2 | 13.9 | 10.5 | 8.5 | 9.0 |
| $M_{100}$, MPa | — | 5.5 | 5.6 | 5.7 | 5.8 | 6.2 | 5.7 | 5.9 | 6.0 | 6.2 | — | — |
| Ult. Elong., % | — | 480 | 430 | 360 | 260 | 550 | 440 | 410 | 360 | 240 | 80 | 70 |
| Shore D | — | — | 30 | 29 | 32 | 24 | 28 | 31 | 33 | 33 | 47 | 48 |
| Ten. Set, % | — | 22 | 12 | 10 | 9 | 17 | — | 12 | 10 | 9 | — | — |

TABLE III-continued

| COMPOSITION: | 1 | 2 | 3 | 4 | 5 | 6 | 7 | 8 | 9 | 10 | 11 | 12 |
|---|---|---|---|---|---|---|---|---|---|---|---|---|
| Hot Set, % | — | INF. | 100 | 52 | 26 | INF. | INF. | 67 | 44 | 19 | 16 | 9 |
| Oil Swell, % | — | 450 | 413 | 336 | 253 | 436 | 330 | 344 | 304 | 218 | 97 | 67 |

TABLE IV

| COMPOSITION | A | B | C | D | E | F |
|---|---|---|---|---|---|---|
| Polyethylene | 100 | — | — | — | — | — |
| EPDM Rubber | 100 | — | — | — | — | — |
| Phenolic Resin | 10 | — | — | — | — | — |
| Zinc Oxide | 2 | — | — | — | — | — |
| Composition A | — | 100 | → | → | → | → |
| Peroxide | — | 0.5 | 1.0 | 2.0 | 1.0 | 0.5 |
| Co-Agent | — | — | — | — | 2.0 | 2.0 |
| Properties | | | | | | |
| Ult. Tensile, MPa | 15.7 | 16.9 | 16.7 | 16.2 | 17.6 | 16.9 |
| $M_{100}$, MPa | 8.1 | 6.7 | 6.5 | 6.5 | 7.2 | 7.4 |
| Ult. Elong., % | 400 | 580 | 570 | 520 | 570 | 500 |
| Hardness, Shore A | 86 | 87 | 86 | 89 | 89 | 85 |
| Tension Set, % | 22 | 20 | 19 | 17 | 18 | 21 |
| Hot-Set | | | | | | |
| Elongation, % | F[1] | F[2] | 110 | 25 | 20 | 35 |
| After 5 min recovery | — | — | 15 | 5 | 0 | 0 |
| After R.T. Cooling | — | — | 10 | 0 | 0 | −5 |

[1] Immediately
[2] At 3'10"

TABLE V

| COMPOSITION | G | H | I | J | K | L | M |
|---|---|---|---|---|---|---|---|
| Polyethylene | 100 | — | — | — | — | — | — |
| EPDM Rubber | 100 | — | — | — | — | — | — |
| Phenolic Resin | 2 | — | — | — | — | — | — |
| $SnCl_2$—$2H_2O$ | 0.2 | — | — | — | — | — | — |
| Composition G | — | 100 | → | → | → | → | → |
| Peroxide | — | 0.5 | 1.0 | 2.0 | 1.0 | 0.5 | 1.0 |
| Co-Agent | — | — | — | — | 2.0 | 2.0 | 2.0 |
| Properties | | | | | | | |
| Ult. Tensile, MPa | 17.6 | 19.7 | 18.1 | 15.5 | 18.3 | 18.0 | 14.8 |
| $M_{100}$, MPa | 9.3 | 8.8 | 8.8 | 8.8 | 9.4 | 9.5 | 10.1 |
| Ult. Elong., % | 640 | 660 | 540 | 390 | 430 | 510 | 300 |
| Shore D Hardness | 41 | 40 | 41 | 43 | 42 | 41 | 38 |
| Ten. Set, % | 31 | 27 | 24 | 20 | 25 | 27 | 22 |
| Hot-Set | | | | | | | |
| Elongation, 15 min, % | F | 75 | 15 | 5 | 15 | 25 | 5 |
| After 5 min recovery | — | 7.5 | 0 | 0 | 0 | 0 | −5 |
| After R.T. Cooling | — | 5 | −5 | −5 | −5 | −5 | −10 |

Phenolic resin (the same as used in Example I) and zinc oxide were then added, and mixing was continued for two minutes after maximum consistency was reached (as indicated by torque measurements). The stock was removed, then re-mixed for an additional one minute, removed and cooled. This stock is identified as "Composition A" in Table IV.

The crosslinking step was accomplished by adding the peroxide (and optional co-agent) to Compositions A and G on an open mill at 70° C. and mixing until well dispersed. The peroxide was 2,5-dimethyl-2,5-di(t-butylperoxy) hexane; the co-agent was trimethylolpropane triacrylate. Stocks were then press-cured for 30 minutes at 180° C. The control samples, without peroxide, were compression molded at 200° C. to form a sheet.

Physical testing was done, with stress-strain properties evaluated at 50 cm/min. according to ASTM D-638 and D1566; hot set as in Example I. Compositions and test results are shown in Table IV.

EXAMPLE III

The procedures of Example II were repeated, except that instead of zinc oxide, $SnCl_2$ $2H_2O$ was added as a vulcanization activator. This stock is identified as "Composition G." In one stock (M), m-phenylene-N,N'-bismaleimide was used as a crosslinking co-agent. Compositions and test results are shown in Table V.

Although the invention has been illustrated by typical examples, it is not limited thereto. Changes and modifications of the examples of the invention herein chosen for purpose of disclosure can be made which do not constitute departure from the spirit and scope of the invention.

The embodiments of the invention in which an exclusive property of privilege is claimed are defined as follows:

1. A shaped article comprising a blend of rubber and plastic, wherein the rubber is a homopolymer or copolymer from conjugated diene monomer, or a copolymer of ethylene and propylene with a minor proportion of non-conjugated diene monomer, the rubber is vulcanized with a phenolic curative and is in the form of discrete vulcanized particles dispersed in a continuous phase of the plastic and the plastic is crystalline polymer or copolymer fronm ethylene monomer, the blend having been exposed to free-radical crosslinking after shaping of the article, so as to convert the blend from a thermoplastic to a thermoset.

2. The article of claim 1, wherein the rubber was dynamically vulcanized in the blend.

3. The article of claim 1 wherein the free-radical crosslinking was effected by radiation or an organic peroxide.

4. The article of claim 1 wherein the blend contains, on a basis of 100 parts by weight of rubber and plastic, from 85 to 15 parts by weight of rubber and from 15 to 85 parts by weight of plastic.

5. The article of claim 1 wherein the phenolic curative comprised from 1 to 20 parts by weight of a methylol phenolic resin and from 0.5 to 50 parts by weight of activator, including a metal oxide, per 100 parts by weight of the rubber.

6. The article of claim 2 wherein the blend was crosslinked with a peroxide curative.

7. The article of claim 6 wherein the peroxide curative was 2,5-dimethyl-2,5-di(t-butylperoxy) hexane, and was present in the amount of from 0.1 to 5.0 parts by weight per 100 parts by weight of the blend.

8. The article of claim 1 which was shaped by extrusion, thermoforming or injection molding.

9. The article of claim 1 wherein the non-conjugated diene monomer is ethylidene norbornene.

10. The article of claim 1, wherein the proportions of rubber to plastic in the blend are from 25 to 75 parts of rubber, and correspondingly, 75 to 25 parts plastic, by weight, based on 100 parts of total rubber and plastic.

* * * * *